United States Patent
Degoul et al.

(10) Patent No.: US 7,620,465 B2
(45) Date of Patent: Nov. 17, 2009

(54) FAULT-TOLERANT NODE ARCHITECTURE FOR DISTRIBUTED SYSTEMS

(75) Inventors: Paul M. Degoul, Paris (FR); Robert J. Disser, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 521 days.

(21) Appl. No.: 11/355,445

(22) Filed: Feb. 16, 2006

(65) Prior Publication Data

US 2006/0212135 A1    Sep. 21, 2006

Related U.S. Application Data

(60) Provisional application No. 60/657,011, filed on Feb. 28, 2005.

(51) Int. Cl.
| | |
|---|---|
| G05B 9/02 | (2006.01) |
| G05B 19/18 | (2006.01) |
| G05B 11/01 | (2006.01) |
| G06F 11/00 | (2006.01) |
| G06F 7/00 | (2006.01) |

(52) U.S. Cl. ............ 700/82; 700/2; 700/3; 700/4; 700/19; 700/20; 714/13; 701/76

(58) Field of Classification Search ............ 700/2–4, 700/9, 10, 19–21, 82; 714/11–13; 701/33, 701/39, 43, 62, 76, 92, 107; 702/182–185
See application file for complete search history.

(56) References Cited

U.S. PATENT DOCUMENTS

| | | | |
|---|---|---|---|
| 3,636,331 A | * | 1/1972 | Amrehn ............ 700/82 |
| 4,347,564 A | * | 8/1982 | Sugano et al. ............ 700/3 |
| 5,261,085 A | | 11/1993 | Lamport |
| 5,815,649 A | | 9/1998 | Utter et al. |
| 5,881,239 A | | 3/1999 | Desgrousilliers |
| 6,061,600 A | * | 5/2000 | Ying ............ 700/3 |
| 6,308,282 B1 | | 10/2001 | Huang et al. |
| 6,345,225 B1 | | 2/2002 | Böhm et al. |
| 6,356,422 B1 | * | 3/2002 | Bilac et al. ............ 361/93.1 |
| 6,826,182 B1 | | 11/2004 | Parthasarathy |
| 2001/0026098 A1 | | 10/2001 | Hackl |

FOREIGN PATENT DOCUMENTS

| | | |
|---|---|---|
| DE | 103 16 452 | 10/2004 |
| EP | 0 999 117 | 5/2000 |
| EP | 1 231 121 | 8/2002 |

OTHER PUBLICATIONS

European Search Report dated Jun. 19, 2006.

* cited by examiner

*Primary Examiner*—Sean P Shechtman
(74) *Attorney, Agent, or Firm*—Thomas N. Twomey

(57) ABSTRACT

A distributed architecture system including a plurality of nodes operatively coupled together by a bus. Each node includes a main controller configured to provide data to the bus and to an actuator, and a supervisory controller configured to provide data to the bus and to the actuator. Each node is configured such that during normal operations the main controller provides data to the actuator that controls the actuator and the supervisory controller generally does not provide data to the actuator that controls the actuator. Each node is configured such that if it is determined that the main controller is providing improper data, the supervisory controller provides data to the actuator that controls the actuator and the main controller does not provide data to the actuator that controls the actuator.

13 Claims, 2 Drawing Sheets

FAULT-TOLERANT NODE ARCHITECTURE FOR DISTRIBUTED SYSTEMS

This application claims priority to U.S. Provisional App. Ser. No. 60/657,011, filed on Feb. 28, 2005, the entire contents of which are hereby incorporated by reference.

The present invention is directed to a fault tolerant node architecture, and more particularly, to a fault tolerant node architecture for use with a distributed system.

BACKGROUND

Electromechanical brake systems are attracting increasing interest for use in and with motor vehicles. For example, electromechanical brake systems may have a central controller and/or a controller associated with each brake control subsystem that is located at the corner of the vehicle. The controllers may be coupled to a bus (such as a time triggered bus or an event triggered bus) to provide communication by and between the various controllers. Because such electromechanical brake systems may rely exclusively upon electromechanical systems to control the brakes, these systems typically include significant redundancies and backups. Some systems may have a fail-safe or fail-silent architecture such that the system may continue to function, but at a reduced level of performance, when one of the nodes (i.e. a corner controller) becomes faulty and/or is shut down.

There is a desire to provide a distributed system that is fault tolerant or fail operational such that the system can continue to function normally, or close to normally, even if one of the nodes or part of the nodes becomes faulty and/or is shut down. Such a fault tolerant system provides advantages over fail-safe or fail-silent systems in which the system may continue to function, but at a reduced level of performance. Classical systems require three controllers at a single node to provide sufficient redundancy to provide a fault tolerant node. However, it may be cost prohibitive to provide three controllers at each node for many systems, such as automotive control systems.

Accordingly, there is a need for a fault tolerant node architecture for use with systems or controllers that are coupled to a bus. There is a need for such a fault tolerant node architecture which can be used in a distributed system, and which takes advantage of the distributed nature of the system to provide the fault-tolerant features.

SUMMARY

In one embodiment, the present invention is a fault tolerant node architecture for use with systems or controllers that are coupled to a bus, such as an event triggered bus or a time triggered bus. In particular, in one embodiment the invention is a distributed architecture system including a plurality of nodes operatively coupled together by a bus. Each node includes a main controller configured to provide data to the bus and to an actuator, and a supervisory controller configured to provide data to the bus and to the actuator. Each node is configured such that during normal operations the main controller provides data to the actuator that controls the actuator and the supervisory controller generally does not provide data to the actuator that controls the actuator. Each node is configured such that if it is determined that the main controller is providing improper data, the supervisory controller provides data to the actuator that controls the actuator and the main controller does not provide data to the actuator that controls the actuator.

DETAILED DESCRIPTION

Figure 1:
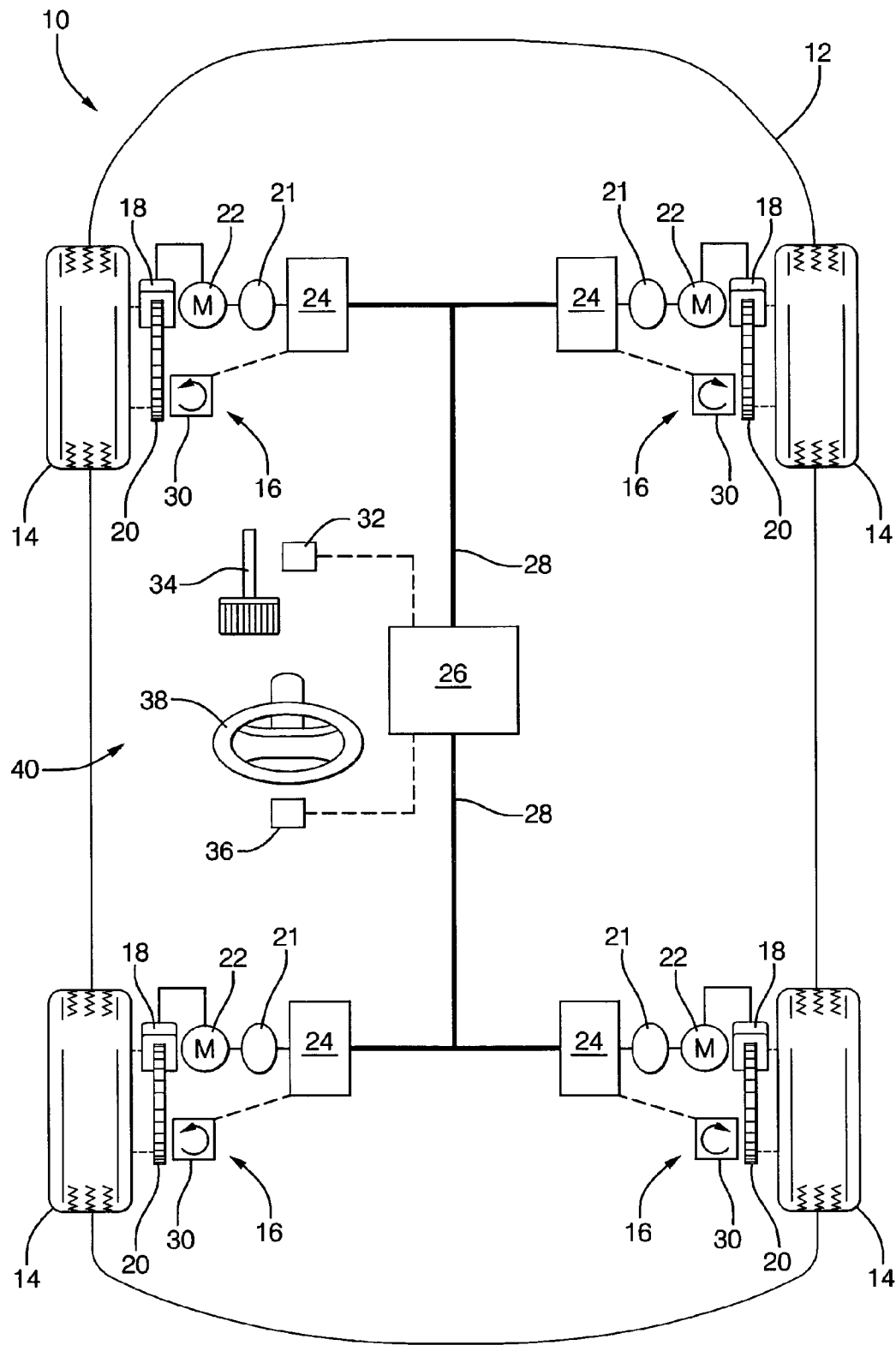
FIG. 1 is a schematic representation of a motorized vehicle utilizing various controllers.

The node architecture of the present invention may be implemented in a vehicle 10 having a vehicle body 12, as shown in FIG. 1. The vehicle 10 includes a set of wheels 14 with each wheel 14 being located at or adjacent to a corner of the vehicle 10. Each wheel 14 may include a brake subsystem 16, such as an electromechanical brake system. Each brake subsystem 16 may include a caliper 18 and a rotor 20 rotationally coupled to the associated wheel 14. Each caliper 18 is operatively coupled to a motor 22 having an associated motor driver 21. The motor 22 can be operated to cause the caliper 18 to be displaced to cause a brake pad located thereon (not shown) to engage the rotor 20 and cause braking and deceleration of the vehicle 10 in a well-known manner.

Each brake subsystem 16 may further include or be coupled to a remote processor/controller or corner processor/controller 24 located adjacent to or associated with a wheel 14 to control the brake forces applied to that wheel 14. Each corner processor 24 may be coupled to a central processor/controller 26 and to the other corner processors 24, or to other additional processors or controllers (not shown) by a main communication bus 28 to create a larger system. Each processor 24, 26 may be or include any of a wide variety of controllers, microcontrollers, electronic control units ("ECU"), processors, chips, logic circuitry, or the like, but is termed a "processor" herein to encompass all of these terms and structures. Each corner processor 24 can provide signals/instructions to the associated motor driver 21. Each motor driver 21 can then convert the signals/instructions into electrical signals/instructions which are fed to the associated motor 22 to control movement and actuation of the associated motor 22/caliper 18.

The system of FIG. 1 illustrates a vehicle 10 with an electromechanical brake subsystem 16 located at each wheel 14. However, if desired, less than all of the wheels 14 (i.e. only two wheels) may include or utilize an electromechanical brake subsystem. In this case, those other wheels may include a traditional hydraulic brake subsystem.

The vehicle 10 may include a main communication bus 28 that can receive and transfer data to and from each of the processors 24, 26. The bus 28 may take any form capable of transferring a signal or data, including electrical, optical, or radio signals and may include and employ various technologies in its implementation, such as wired, wireless, fiber optic, and the like, including combinations thereof. The bus 28 may be or include any of a wide variety of communications networks, bus systems or configurations, asynchronous and synchronous communications systems and protocols, and the like, as well as combinations thereof. Although only a single bus 28 is illustrated, the bus 28 should have sufficient capacity to provide the required data transmission and may actually include multiple busses or sub-busses. In this manner, each of the corner processors 24 and/or central processor 26 has the ability to control and/or monitor and/or communicate with the other processors 24, 26.

The bus 28 can have a variety of configurations or topologies, including a star configuration, a ring configuration, or other configurations. The bus 28 may utilize or incorporate an event-triggered protocol in which case the bus 28 may be, for example, a CAN (controller area network) data bus line or a VAN (vehicle area network) data bus line. Alternately, the bus 28 may utilize or incorporate a time-triggered protocol, in which case the bus 28 may be, for example, a FLEXRAY® data bus, or a TTP/C bus, or a TTCAN bus, or a TITAN® bus sold by Titan Corporation of San Diego, Calif.

Each of the processors 24, 26 receives data relating to various conditions and components of the vehicle 10. For example, FIG. 1 shows a plurality of wheel speed sensors 30, with each wheel speed sensor 30 being located adjacent to a wheel 14 and providing its output to an associated, adjacent corner processor 24. FIG. 1 also illustrates a brake pedal sensor 32 configured to determine the displacement of a brake pedal 34, and a steering wheel sensor 36 configured to determine the rotational position of a steering wheel 38. The brake pedal sensor 32 and steering wheel sensor 36 are coupled to the central processor 26. However, the vehicle/system may include a variety of additional sensors (not shown) that track a variety of vehicle/system conditions, such as vehicle speed, vehicle heading, slip conditions of a wheel, longitudinal and lateral acceleration, yaw, etc. The various sensors may be directly coupled to each or selected ones of the processors 24, 26 to provide their output signals thereto. Each processor 24, 26 may then process the data received from the various sensors.

Each processor 24, 26 may be considered to be a node such that input data flows into the node and output data flows out, and each node 24, 26 may be desired to have a fault-tolerant structure or architecture. In addition, the various sensors (i.e., sensors 30, 32, 36) and processors 24, 26 may define or be part of a larger control system 40 which has a fault-tolerant structure or architecture. The node architecture outlined below may be utilized or incorporated into each of the processors 24, 26 used in the motorized vehicle 10, and more particularly, utilized or incorporated into the processors 24, 26 of an electromechanical (i.e., brake-by-wire) system.

However, it should be understood that the node architecture disclosed herein may be utilized in or incorporated into nearly any vehicle processor or system, such as steering (i.e. steer-by wire) processors, throttle-by-wire processors or systems, active suspension processors or systems or nearly any drive-by-wire processor, controller or control system. In addition, the invention and node architecture discussed herein is not necessarily limited to use with processors or controllers utilized in automobiles or motorized vehicles, and could be used in any system utilizing nodes, processors or controllers that provide an output.

Figure 2:
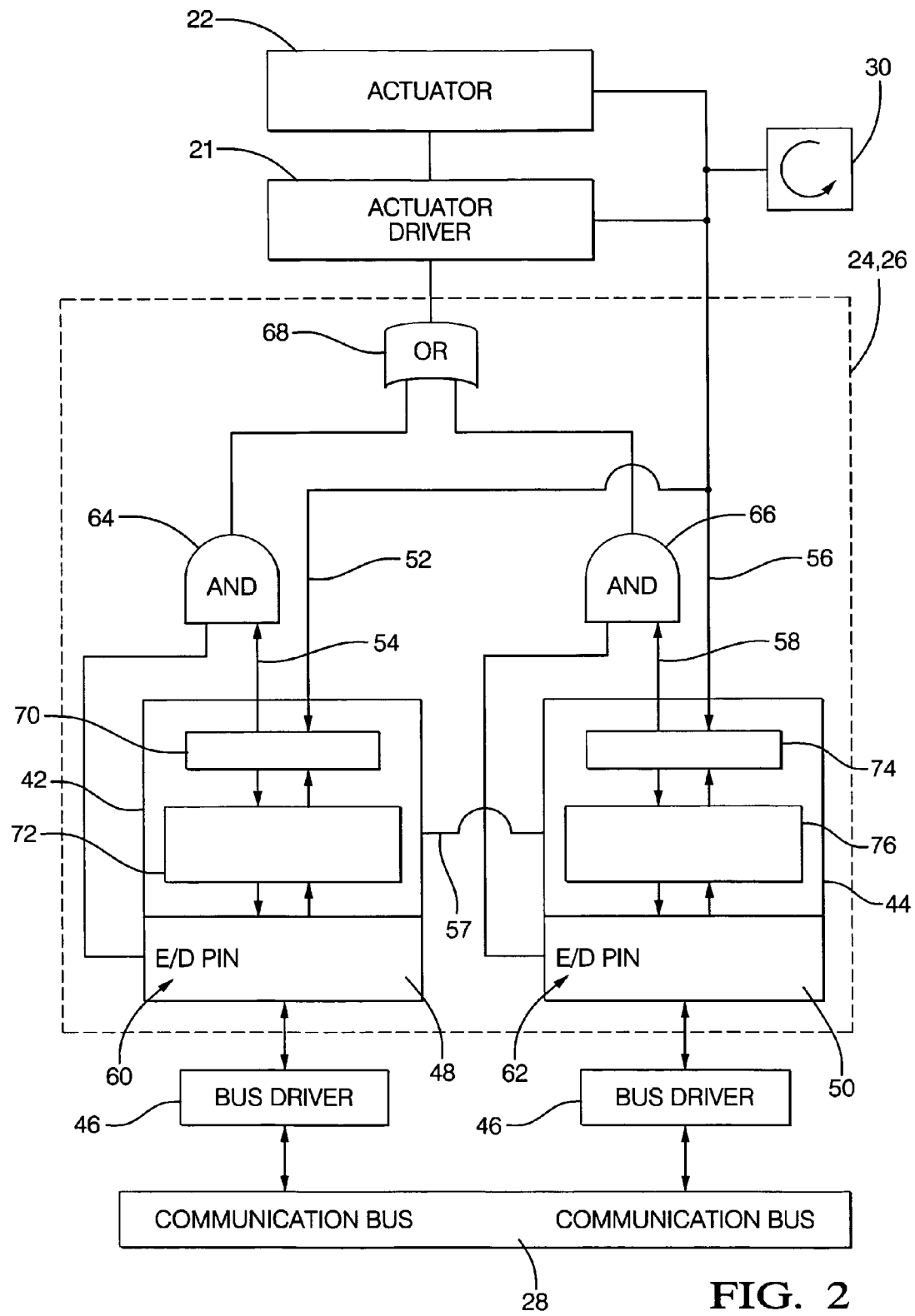
FIG. 2 is a schematic representation of various components forming a single node of a fault tolerant system of the present invention.

FIG. 2 schematically illustrates the architecture of a single remote processor or node 24, 26. Each remote processor 24 and optionally the central processor 26 may have the same architecture shown in FIG. 2. The system of FIG. 2 utilizes a dual microcontroller architecture wherein the node 24, 26 includes a main controller or main hardware 42 and supervisory controller or supervisory hardware 44. The supervisory controller 44 may have the same processor or processing capabilities as the main controller 42. In this case, the supervisory controller 44 may run the same processing algorithms or carry out the same calculations as the main controller 42 such that the main controller 42 and supervisory controller 44 form a symmetrical configuration.

Alternately, it may be preferred that the node 24, 26 have an asymmetric configuration in which the supervisory controller 44 may have reduced processing power and may run simplified versions of the algorithms and calculations run by the main controller 42. For example, the supervisory controller 44 may be a low-end microcontroller, or take the form of hardware or circuitry such as a field programmable gate array ("FPGA"), an application specific integrated circuit ("ASIC") or the like. The supervisory controller 44 may be a fairly basic controller which includes communication controller protocol (i.e., so that the supervisory controller 44 can communicate with the bus 28) and basic logic to drive the actuator driver 21. The supervisory controller 44 should also have an actuator signal interface to provide outputs and process inputs.

Each of the main 42 and supervisory 44 controllers are individually coupled to the bus 28 by an associated bus driver or transceiver 46. The main controller 42 and supervisory controller 44 each include, or are coupled to, a communication controller 48, 50 which accumulates and stores data provided from the associated main 42 or supervisory controller 44. Each communication controller 48, 50 may be physically integrated with its associated main 42 or supervisory 44 controller. In this case the communication controller 48, 50 could be located on the same integrated chip as its associated controller 42, 44 and the communication controllers 48, 50 are considered internal peripherals. Alternately, each communication controller 48, 50 could be physically separated from its associated main 42 or supervisory 44 controller, in which case each communication controller 48, 50 could be functionally integrated with its associated main 42 or supervisory 44 controller.

As noted above the main controller 42 and/or its communication controller 48 are coupled to an associated bus driver 46 which is, in turn, coupled to the main bus 28. The supervisory controller 44 and/or its communication controller 50 are similarly coupled to an associated bus driver 46 which is coupled to the main bus 28. Each communication controller 48, 50 may be connected to the associated bus driver 46 by a transmit ("Tx") line, a receive ("Rx") line, and/or a transmit enable ("TxEn") line (not shown) in the well known manner.

Each of the main 42 and supervisory 44 controllers independently receive data (i.e., travel of the brake pedal 34, position of the steering wheel 38, speed of the wheels 14, etc.) via the bus 28. In addition, the bus 28 may provide data relating to the velocity of the vehicle 10, the lateral acceleration of the vehicle, the heading requested by the driver, the braking requested by the driver, slip levels of each wheel, longitudinal and lateral acceleration, yaw, etc. Each of the main 42 and supervisory 44 controllers also receive data from the associated actuator 22 (i.e. motor), actuator driver 21 (i.e. motor driver), associated wheel speed sensor 30, or other sensors via an associated digital/analog sensor input 52, 56.

The main 42 and supervisory 44 controllers then each independently process the input data and provide output data or signals. In the electromechanical brake system of FIG. 1, the output of each controller 42, 44 may be data that determines whether the brake motor 22 at any of the wheels 14 should be activated to cause braking force to be applied to the associated wheel 14 (i.e. to match the driver input or requested braking via the brake pedal 34). Thus, the main controller 42 processes the inputs and determines whether any action (i.e. braking) is required, and if so, what sort of braking action is required in response to the driver input. The main controller 42 then provides its output 54 which is fed through various logic (discussed below) and to the actuator driver 21/actuator 22 to control operation of the associated actuator/brake motor 22. The main controller 42 also provides its output to the other processors 24, 26 via its communication controller 48 and bus driver 46 to the bus 28. The output of data from the main controller 42 and the supervisory controller 44 to the actuator 22 and bus 28 can be either direct or indirect.

The main controller 42 includes a driver interface 70 which interfaces with the actuator 22/actuator driver 21, and processes sensor inputs 52. For example, input data provided to the driver interface 70 via input line 52 may take the form of voltage and/or current that was provided to the actuator 22/actuator driver 21, the motor position of the actuator 22, etc. The driver interface 70 may provide controlling data via the output line 54 to the actuator 22/actuator driver 21 in the form of voltage and/or current to be supplied to the actuator 22/actuator driver 21.

The main controller 42 includes an internal processing unit 72 which carries out the higher-level functions of the main controller 42. For example, the internal processing unit 72 may calculate motor driver commands for each actuator 22/actuator driver 21 in the system, carry out voting calculations, ABS calculations, TCS calculations, etc.

The supervisory controller 44 may be configured in a manner similar to the main controller 42. The supervisory controller 44 receives inputs from the bus 28/bus driver 46, as well as through its digital/analog input 56 in a similar manner to the main controller 42. If it has sufficient capacity, the supervisory controller 44 may process the input and determine whether any braking action is required, and if so, what sort of braking action is required. The output of the supervisory controller 44 is fed to the bus 28, as well as outputted through its output or digital output 58. If the supervisory controller 44 is sufficiently basic and rudimentary, the supervisory controller 44 may not necessarily calculate what sort of braking action is required, and may instead simply carry out basic calculations. These calculations may correspond to some of the most important brake control determiners calculated by the main controller 42, or may take the form of a test sequence calculations (i.e. to test functionality of the supervisory controller 44) that are not necessarily part of a braking application algorithms.

The supervisory controller 44 may have a driver interface 74 which is of the same or similar design as the driver interface 70 of the main controller 42. The supervisory controller 44 may also include an internal processing unit 76. In a non-symmetrical configuration, the internal processing unit 76 has less processing capability than the internal processing unit 72 of the main controller 42. In one embodiment, the internal processing unit 76 lacks the capability to carry out higher-level processing (i.e. calculating motor driver commands, ABS calculations, TCS calculations, or the like). In its most basic form, the internal processing unit 76 has only enough processing ability to forward consensus commands to its output 58 which are provided from other nodes in the system. However, the internal processing unit 76 can have a range of processing capabilities, and may be able to provide any, all, or some of the higher-level capabilities provided by the main controller 42.

Each node/corner processor 24 (and its controllers 42, 44) may carry out its functions/calculations (i.e., determining whether brake control is needed, and if so how to implement such brake control) for its associated wheel 14/brake subsystem 16, as well as for the other wheels 14/brake subsystems 16 of the vehicle 10. As an illustrative example, the processor 24, 26 of FIG. 2 may be considered to be the corner processor 24 for the right front wheel 14 of the vehicle 10 of FIG. 1. Upon receiving inputs from the bus 28 and/or through the inputs 52, 56, the main controller 42 and possibly the supervisory controller 44 of that node 24 will calculate brake control determiners or functions (or various other higher level functions) for the right front brake subsystem 16, as well as for the other three brake subsystems 16 of the vehicle 10.

As outlined above, the main 42 and supervisory 44 controllers provide their data to the bus 28. In this manner, the controllers 42, 44 and nodes 24, 26 can monitor the data and output of each other. In addition, the main controller 42 and supervisory controller 44 of each node 24, 26 may be directly coupled by a serial peripheral interface ("SPI") or other operational connection 57 to directly provide all or part of their outputs to each other such that each supervisory controller 44 can directly monitor its associated main controller 42, and possibly vice versa.

Thus, the output information of the controllers 42, 44 may be monitored/validated by each other by either the SPI connection 57 and/or by information placed on the bus 28. Reviewing information provided on the bus 28, as opposed to exchanging information by the SPI connection 57 may be more efficient due to limited bandwidth of the SPI connection 57. The supervisory controller 44 may monitor/validate all of the output or data of the main controller 42, or only part of its output or data. Similarly the controllers of the other nodes 24, 26 may monitor/validate all of the output or data of the main controller 42, or only part of its output or data.

As will be discussed in greater detail below, during normal operations, the logic circuitry of the node 24 ensures that the output 54 of the main controller 42 overrides or supersedes any output 58 of the supervisory controller 44 such that the main controller 42 controls operation of the actuator driver 21/actuator 22. However, during a fault of the main controller 42 the output 58 of the supervisory controller 44 may control or oversee operation of the actuator driver 21/actuator 22.

The communications controllers 48, 50 for the main 42 and supervisory 44 controllers may each include an enable/disable pin 60, 62 that provides an output (i.e. an override signal) to the logic circuitry of the node 24, 26. The output of each enable/disable pin 60, 62 may be a digital output, such as a digital one (high signal) or a digital zero (low signal). The output of each enable/disable pin 60, 62 is provided to an associated operative AND gate or function 64, 66, along with the output 54, 58 of the associated controller 42, 44. The output of each AND gate 64, 66 is fed to an operative OR gate or function 68, which in turn provides its output to the actuator driver 21/actuator 22.

During normal operation, the output of the enable/disable pin 60 of the main controller 42 is a digital one or a high signal, and the output of the enable/disable pin 62 of the supervisory controller 44 is a digital zero or a low signal. In this manner, when the output 54 of the main controller 42 is provided to its associated AND gate 64, the output of the AND gate 64 matches the output 54 of the main controller 42. Conversely, when the output 58 of the supervisory controller 44 is provided to its associated AND gate 66, the output of that AND gate 66 will normally be a digital zero or a low signal.

The output of the two AND gates 64, 66 is then fed to the OR gate 68. During normal operations, the output of the OR gate 68 will correspond to the output of the AND gate 64, which corresponds to the output 54 of the main controller 42. In this manner, during normal operations the main controller 42 provides instructions to, and controls operation of, the actuator driver 21 and actuator 22.

As described above the supervisory controller 44 monitors the output of the associated main controller 42. In addition, the other corner processors 24 and/or central processor 26 monitor the output of the main controller 42. The supervisory controller 44 and/or other processors 24, 26 then collectively determine whether the main controller 42 is malfunctioning or functioning normally. For example, when the processor 24 of FIG. 2 is a processor for the right front wheel of the vehicle 10 of FIG. 1, its associated supervisory controller 44, and the other processors 42, 44 at the other nodes 24, 26 may all participate in the determination process involving whether the main controller 42 of the right front node is malfunctioning. This determination can involve consideration of the output of the main controller 42 under consideration, the timing of the output of the main controller 42, and various other factors including the state of health ("SOH") of the main controller 42.

SOH is a bit of information relating to the functioning state of a controller 42, 44. The default of the SOH data field for the main controller 42 is "OK." During normal processing operations, the main controller 42 may be requested to "toggle" a set of bits in a predetermined fashion. If the main controller 42 does not toggle the bits in the desired manner, then the SOH bit for that main controller 42 may be switched to "NOK" or "not OK." Thus, the main controller 42 may essentially be required to complete a diagnostic test or perform a test set of calculations in order to maintain its "OK" SOH status.

The timing of the output of the main controller 42 under consideration may also be monitored and taken into consideration. For example, the main controller 42 may have an expected timing pattern relating to the timing or manner in which the controller 42 is expected to provide data to the bus 28. If the controller 42 sufficiently deviates from its expected timing pattern, this can be taken as evidence of faulty operation of the controller 42.

In an extreme example relating to the expected timing pattern, a controller 42 may malfunction to the extent that it is providing a constant stream of meaningless data to the bus 28. The supervisory controller 44 (or the other nodes 24, 26) may be able to quickly determine that the main controller 42 is malfunctioning due to the length of the data stream being provided to the bus 28 by the main controller 42. It may be particularly important to shut down a malfunctioning main controller 42 that provides a constant stream of bad data since this malfunctioning controller could essentially monopolize the bus 28 and prevent other controllers and components from communicating via the bus 28. In this sense the system 40 monitors data in both the time domain and value domain to determine the good/bad status of the main controller 42.

As noted above, value of data, timing of data and SOH are some of the factors that may be considered by the other processors and nodes to collectively determine whether the main controller 42 is malfunctioning. If the supervisory controller 44 has sufficient processing capabilities, the supervisory controller 44 may participate in the determination of the status of the main controller 42. The output of the supervisory controller 44 and/or other nodes 24, 26 relating to the malfunctioning/normal status of the main controller 42 may be voted upon in order to collectively determine whether the main controller 42 is malfunctioning or functioning normally. Thus, in order to be able to provide a meaningful voting procedure, at least two other components (i.e. a combination of two components from a group including the associated supervisory controller 44 and other nodes 24, 26, as well as, possibly, their individual controllers 42, 44) should be available to participate in the voting procedure.

If the system 40 determines that the main controller 42 of a given node is malfunctioning, or is outputting invalid or improper data, the system 40 takes steps to shut down or override that main controller 42, and in particular may prevent the main controller 42 from providing data to its associated actuator driver 21/actuator 22. Steps may also be taken to ignore any controlling data that the controller 42 provides to the bus 28. In order to shut down or override the data that the malfunctioning controller 42 is providing to the associated actuator driver 21/actuator 22, when it is determined that the main controller 42 is malfunctioning, the position/output of the enable/disable pin 60 of the main controller 42 is switched to a low signal. The position of the pin 60 is switched by hardware voting inputs in the communication controller 48 that are received from the other nodes 24, 26 transmitted via the bus 28. Simultaneously, the position/output of the enable/disable pin 62 of the associated supervisory controller 44 is switched to a high signal by inputs via the bus 28.

In this case the output of the AND gate 64 associated with the main controller 42 is a digital zero or low signal, and the output of the AND gate 66 associated with the supervisory controller 44 matches the output 58 of the supervisory controller 44. The output of the OR gate 68, which is fed to the actuator driver 21/actuator 22, matches the output 58 of the supervisory controller 44. Accordingly, in this "override" state of the node 24, 26 the supervisory controller 44 controls operations of, or provides signals to, the actuator driver 21/actuator 22.

In order to determine the instructions to be provided to the actuator driver 21/actuator 22 via the output 58, the system 40 polls the other nodes 24, 26 to vote on the instructions. If the supervisory controller 44 has sufficient processing capabilities, the supervisory controller 44 may participate in the voting process. Once the system 40/supervisory controller 44 determines the proper output to be provided to its associated actuator driver 21/actuator 22, the supervisory controller 44 provides the instructions to the actuator driver 21/actuator 22 via its output 58. As noted above, the logic structure of the node 24, 26 ensures that the output 58 is forwarded through the AND gate 66, the OR gate 68 and to the actuator driver 21/actuator 22. Accordingly, during the shutdown of the main controller 42 the supervisory controller 44 may essentially function as a "gateway" to forward consensus control data to the actuator driver 21/actuator 22. This state of shutdown or overriding of the main controller 42 continues so long as the system 40 determines that the main controller 42 is not outputting valid data.

The process described above may be used to prevent a faulty main controller 42 from providing output to an actuator 22/actuator driver 21. In addition, the communication between the main controller 42 and the bus 28 may be shut down, as desired, by a bus guardian. The bus guardian functionality may be implemented by the supervisory controller 44, a coprocessor of either the main controller 42 or the supervisory controller 44, the bus diver 46, an independent ASIC, a centralized star coupler bus guardian, or the like.

The process outlined above involves monitoring the output of the main controller 42, and overriding the output of the main controller 42 when the main controller 42 is determined to be malfunctioning. In addition, if desired, the output of the supervisory controller 44 may be monitored. In order to allow monitoring of the supervisory controller 44, the supervisory controller 44 may provide some of its output onto the bus 28 for validation by the system 40. In particular, the bus 28 may feed the supervisory controller 44 basic control information, such as a braking force that is required (i.e. as determined by the three other processors 24).

The supervisory controller 44, and in particular its internal processing unit 76, may have an algorithm or small piece of code programmed thereon which can process the braking force data, and translate the braking force data into actuator driver 21/actuator 22 control data (i.e. the number of turns of electric motor 22 required to match the braking force data). The supervisory controller 44 may then provide the output of this algorithm on the bus 28 such that the processors at the other nodes 24, 26 can review and validate the output of the supervisory controller 44.

If, during its override condition, the supervisory controller 44 of a given node 24, 26 is determined by the system 40 to be malfunctioning, then it can be assumed that both the main 42 and supervisory 44 controller of that single node 24, 26 are malfunctioning (i.e. a $2^{nd}$ level failure has occurred). In this case that node 24, 26 may be shut down or operated in a fail-safe or fail-silent manner. For example, the output of the enable/disable pin 62 of the supervisory controller 44 may be switched to a low signal, while the enable/disable pin 60 of the main controller 42 is maintained at a low signal. These steps essentially shut down the node 24, 26, while ensuring that the faulty node 24, 26 does not interfere with the function of the remaining nodes 24, 26 so that the system 40 remains functional.

If desired the output of the supervisory controller 44 may be monitored, and the supervisory controller 44 may be able to be shut down, even when the node 24, 26 is not in override mode (i.e. when the main controller 42 is operating normally).

The bus communication correctness of the supervisory controller 44 may also be guaranteed by a bus guardian functionality in the same manner as that for the main controller 42 described above. The bus guardian functionality for the supervisory controller 44 may be implemented by a coprocessor of either the main controller 42 or the supervisory controller 44, the bus driver 46, an independent ASIC, a centralized star coupler bus guardian, or the like.

In the system 40 shown in FIG. 1 there are at least four separate nodes (four remote processors 24), and alternately a fifth node in the form of central processor 26. Accordingly, should one or more of the nodes 24, 26 fail completely, the system 40 can still function in a meaningful way. In other words, because the distributive cluster is always able to determine via majority vote on three processors 24, 26, correct data can be provided to the actuator driver 21/actuator 22, even in the case of one fault. Accordingly, a minimum of three nodes may be required for the fault tolerant architecture.

In this manner, a full fail operational distributed system 40, which provides full service in the case of a fault, is provided. In addition, the fail operational system of the present invention can be implemented in a relatively cost effective manner, by simply adding the supervisory controllers 44 to existing systems which may already include the main controllers 42 and actuators 22. As noted above, because the supervisory controllers 42 may be relatively basic components, such as circuitry or hardware, the cost added by the supervisory controllers 42 may be quite low.

While the example described above focuses upon the main 42 and supervisory 44 controller of a single node 24 (for example, the right front node of FIG. 1) it should be understood that the remaining nodes 24, 26 may include a structure and logic similar to that of FIG. 2, and the main 42 and supervisory 44 controllers of those nodes can be monitored and/or overridden. In addition, the main 42 and supervisory 44 controllers of the node 24, 26 of FIG. 2 take place in the voting procedure to determine the status of the controllers 42, 44, of other nodes, and provide their control output to aid in operations should one of those controllers 42, 44 be shut down.

The bus interface presented by each node 24, 26 of FIG. 2 is a double interface in that each of the main 42 and supervisory 44 controllers have independent access to the main bus 28. However, if desired a single bus interface may be utilized. In addition, as noted above, the architecture of the present invention can be used on either a time triggered protocol bus or an event triggered protocol bus. When using a time triggered protocol bus, because the different nodes are intrinsically synchronized, the architecture of the present invention can be implemented relatively easily. If the architecture of the present invention is to be utilized on an event triggered protocol bus, a time synchronization algorithm is implemented to force each node/controller to provide data at a predetermined time to at least somewhat synchronize the bus system.

The architecture of the present invention is independent of bus channel number in that if one channel of the bus fails, data can be provided and communication achieved through the other channel of the bus. In addition, if an enable/disable pin is not available on the communication controller, the functionality of the enable/disable pin, as well as the associated logic, may be able to be implemented using a co-processor of the associated main controller and/or supervisory controller. Alternately, the enable/disable function may be able to be implemented as part of an intelligent bus driver or as an independent ASIC. For each main controller 42 or supervisory controller 44, the enable/disable function and bus guardian functionality may be able to be implemented in the one intelligent bus driver or independent ASIC. It should be understood that the arrangement of logic structures, including the AND gates 64, 66 and OR gates 68 can be varied as desired but still provide the same overall function as the logic structure disclosed herein.

Having described the invention in detail and by reference to the preferred embodiments, it will be apparent that modifications and variations thereof are possible without departing from the scope of the invention.

What is claimed is:

1. A distributed architecture system for controlling a plurality of actuators comprising:
a plurality of nodes with each node being operatively connected to one of the actuators;
each of said nodes including a main controller in communication with the associated actuator for providing instructions to the associated actuator;
a bus electrically interconnecting said main controllers of said plurality of nodes for establishing communication between said main controllers to allow said main controllers to monitor each other and to selectively disable any main controller that is determined to be malfunctioning; and
each of said nodes including a supervisory controller in a functionally parallel configuration with the associated main controller between said bus and the associated actuator for relaying instructions to the associated actuator from the other main controllers of the other nodes in response to the associated main controller being disabled.

2. The system as set forth in claim 1 wherein the determination that any of said main controllers is malfunctioning is at least partially carried out by one of said supervisory controllers.

3. The system as set forth in claim 2 further including a serial peripheral interface connection between said main controller and said supervisory controller of at least one of said nodes for directly establishing communication between the associated main controller and supervisory controller to allow said supervisory controller to monitor said main controller for determining whether said main controller is malfunctioning.

4. The system as set forth in claim 1 wherein said main controllers are configured to vote on instructions for controlling the actuator of any node having a disabled main controller.

5. The system as set forth in claim 4 wherein at least one of said supervisory controllers is configured to vote on instructions for controlling the actuator of any node having a disabled main controller.

6. The system as set forth in claim 1 wherein said main and supervisory controllers of each of said nodes are configured to provide an override output when it is determined that said main controller is malfunctioning.

7. The system as set forth in claim 6 wherein each node is configured such that said override output and said instructions from the associated main controller are both fed to a first logic function and wherein said override output and said instructions outputted by said supervisory controller are both fed to a second logic function.

8. The system as set forth in claim 7 wherein said first and second logic functions are both operative AND functions.

9. The system as set forth in claim 8 wherein the outputs of both of said first and second logic functions is fed to a third logic function.

10. The system as set forth in claim 9 wherein said third logic function is an operative OR function.

11. The system as set forth in claim 10 wherein the output of said third logic function is fed to the associated actuator.

12. The system as set forth in claim 1 wherein said system is an anti-lock braking system and wherein each actuator is a brake motor driver which drives a braking motor.

13. The system as set forth in claim 12 further comprising a motorized vehicle body including a plurality of wheels and wherein each of said nodes is associated with one of said wheels.

* * * * *

UNITED STATES PATENT AND TRADEMARK OFFICE
CERTIFICATE OF CORRECTION

PATENT NO. : 7,620,465 B2  Page 1 of 1
APPLICATION NO. : 11/355445
DATED : November 17, 2009
INVENTOR(S) : Degoul et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Twenty-sixth Day of October, 2010

David J. Kappos
*Director of the United States Patent and Trademark Office*